United States Patent [19]
Fernandes

[11] Patent Number: 5,697,651
[45] Date of Patent: Dec. 16, 1997

[54] FLEXIBLE DUCT JOINT HAVING A LOW LEAKAGE, PRESSURE-BALANCED BELLOWS SEAL

[75] Inventor: Leslie Fernandes, Tujunga, Calif.

[73] Assignee: Senior Flexonics, Inc., Bartlett, Ill.

[21] Appl. No.: 398,211

[22] Filed: Mar. 2, 1995

[51] Int. Cl.$^6$ ........................ F16L 7/00
[52] U.S. Cl. .............. 285/94; 285/263; 285/900; 285/917
[58] Field of Search ............. 285/94, 263, 267, 285/375, 903, 917, 279, 422, 900; 277/236, 206 R

[56] References Cited

U.S. PATENT DOCUMENTS

| | | | |
|---|---|---|---|
| 3,357,723 | 12/1967 | Dumont et al. | 285/263 |
| 3,799,586 | 3/1974 | Caras et al. | |
| 3,869,151 | 3/1975 | Fletcher et al. | |
| 3,995,896 | 12/1976 | Decker | |
| 4,071,269 | 1/1978 | Halling et al. | 285/263 X |
| 4,121,843 | 10/1978 | Halling | 277/206 R |
| 4,165,107 | 8/1979 | Affa et al. | |
| 4,422,220 | 12/1983 | Oda | |
| 4,427,220 | 1/1984 | Decker | 285/263 |
| 4,643,463 | 2/1987 | Halling et al. | |
| 4,652,025 | 3/1987 | Conroy, Sr. | |
| 5,080,405 | 1/1992 | Sasa et al. | 285/903 X |
| 5,112,088 | 5/1992 | Moore et al. | |
| 5,505,498 | 4/1996 | Halling et al. | 285/263 X |

FOREIGN PATENT DOCUMENTS 1516707  10/1989  U.S.S.R. ................ 285/263

*Primary Examiner*—Dave W. Arola
*Attorney, Agent, or Firm*—Dick and Harris

[57] ABSTRACT

Disclosed is a flexible joint for sealing two conduits. One half of the joint includes an annular seal gland with an outer surface defining a static seal face. The other half of the joint includes an inner race member having inner and outer bearing surfaces, the inner surface spaced apart from and generally opposing the outer surface of the seal gland and having a region defining a dynamic seal face. An annular bellows constructed of a plurality of convolutions having varying convolution heights is disposed between the first and second seal faces to form a low leakage seal. The heights of the convolutions decrease in the direction of the first to the second seal faces.

15 Claims, 1 Drawing Sheet

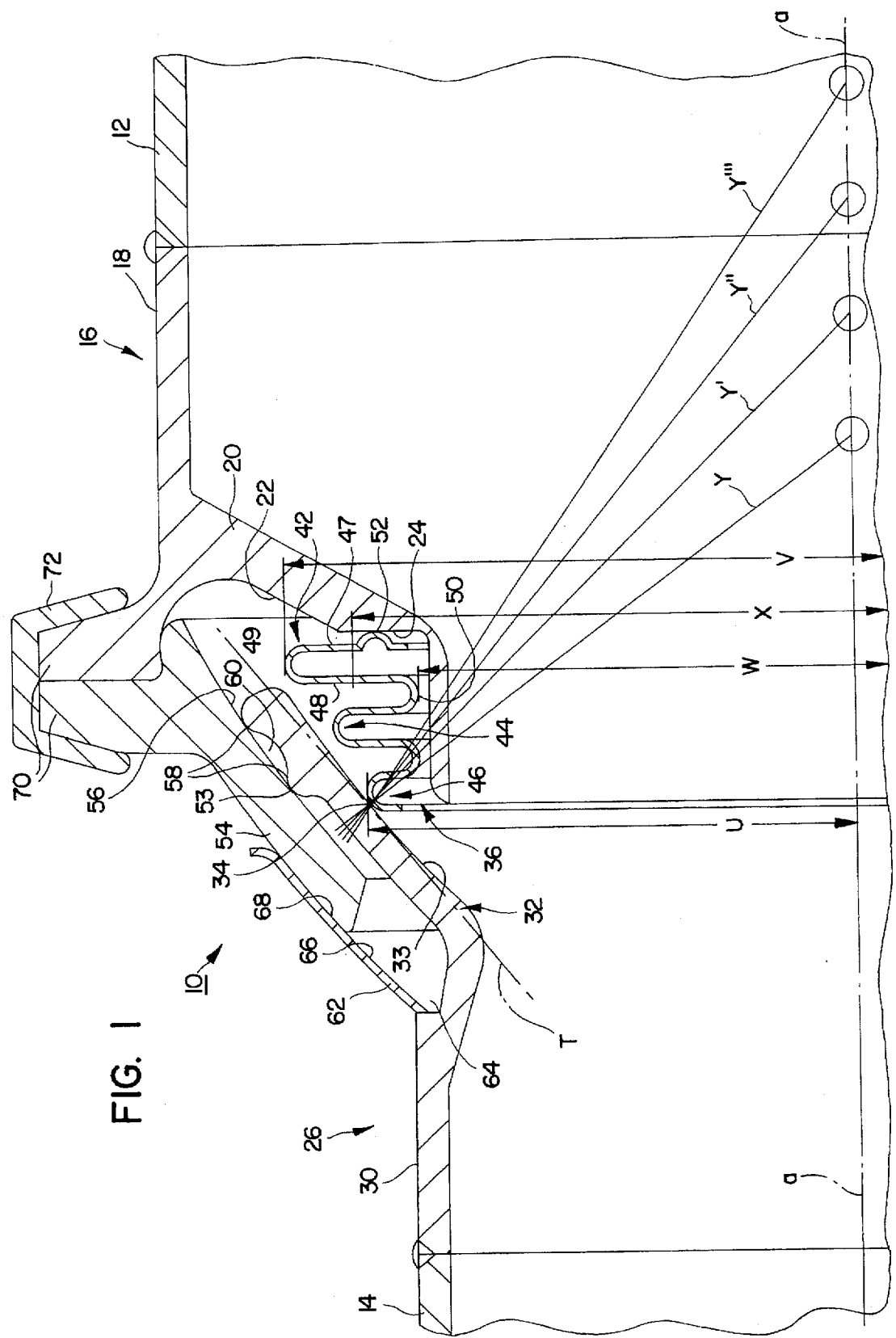

FLEXIBLE DUCT JOINT HAVING A LOW LEAKAGE, PRESSURE-BALANCED BELLOWS SEAL

BACKGROUND OF THE INVENTION

1. Field of the Invention

This invention relates to the mechanical arts. In particular, it relates to a flexible duct joint containing a bellows seal for use in high pressure and high temperature jet aircraft applications.

2. Discussion of the Related Art

As is well-known, jet aircraft engines provide the thrust needed to propel aircraft. Additionally, by redirecting a portion of the compressed air produced by the engines through a conduit system, the air can be used for a variety of other purposes. These other purposes include pressurizing, heating, and cooling the aircraft's cabin, deicing its wings and engine cowlings, and removing moisture from its front windows.

Due to variations in pressure, temperature, wind, and other factors which influence an aircraft in flight and the stresses caused during takeoffs and landings, the conduit system can experience frequent and sudden changes in its position. To minimize any adverse effect of these changes on the integrity of the conduit system, flexible joints connecting rigid duct sections have been proposed and utilized. To be of use, the duct joints must not only permit rotational and angular movement between the rigid ducts, but they must do so with minimum leakage of the compressed air passing through the system. Consequently, such joints must not only to permit rotational and angular movement, but they must include a low leakage seal to minimize escape of the air.

Especially significant in the performance of such joints is the effect of pressure, because of seal wear caused by pressure-induced end loads. For example, with joints employing a conventional bellows seal, the repeated and dramatic changes in pressure cause repeated and dramatic changes in the end loads experienced by the bellows. These changes can lead to a shortened lifetime of the seal. The shortened lifetime, in turn, requires relatively frequent replacement of the seal, with the attendant costs—not only in the cost of the seal, but also in the cost of the downtime of the aircraft.

Moreover, it is inherent in such duct joints that various parts rub together, as the joint rotates and angulates. The friction that develops between the moving pieces can result in a wearing down of the parts further leading to a shortened lifetime for the joint.

Accordingly, there has existed a definite need for an improved duct joint that permits rotational and angular movement between duct sections, while minimizing the escape of compressed air through the conduit system. There has existed a further need for a duct joint that is essentially pressure-balanced, thus minimizing pressure-induced wear of the seal. There has existed a still further need for duct joints which minimize friction between the moving parts, thus minimizing the wear of the moving parts. The present invention satisfies these and other needs and provides further related advantages.

SUMMARY OF THE INVENTION

The present invention is embodied in an improved joint for sealing two cylindrical ducts. The duct joint is made of two halves, each containing a seal face, with an annular bellows seal disposed between the two seal faces to form a low leakage seal.

The first half has a cylindrical collar for forming a gas-tight seal with one duct and, extending and canted from the collar, an annular seal gland defining an outer surface. The outer surface includes a region forming a static seal face.

The second half has a cylindrical collar for forming a gas-tight seal with the other duct. Extending and canted from the second collar is an inner race member having inner and outer bearing surfaces. The inner bearing surface is spaced apart from and generally opposes the outer surface of the seal gland. The inner bearing surface includes a region forming a dynamic seal face.

The outer bearing surface of the inner race member slidably contacts a complimentary, bearing surface on an outer race member. A clip or similar means biases the bearing surfaces against one another. The relative movement between the two surfaces provides for both angular and rotational movement between the duct joint halves and, consequently, between the rigid ducts they connect.

The bellows seal is constructed of a plurality of convolutions having varying heights, so that the mean diameters of the convolutions decreases in the direction of the static to the dynamic seal faces. By choosing the appropriate mean diameters and seal diameters, the bellows seal can be made substantially pressure balanced, i.e., can be constructed so that substantially no pressure-induced end-load is produced. Alternatively, the mean diameters and the seal diameters can be chosen so that a positive or a negative pressure-induced end load is produced.

Coupling means secure the first half to the second half. In some embodiments, the first and second halves have complimentary flange profiles extending outwardly. A standard aircraft flange coupling connector secures the two flange profiles.

In other embodiments, one of the bearing surfaces, preferably the inner race member's outer bearing surface, is formed by apices of two curvilinear regions having an anterior groove in between. When the groove is filled with a high temperature lubricant, such as a graphite petrolatum, the duct joint is self-lubricating.

Other features and advantages of the present invention will become apparent from the following description of the preferred embodiments taken in conjunction with the accompanying drawings, which illustrate, by way of example, the principles of the invention.

BRIEF DESCRIPTION OF THE DRAWING

FIG. 1 is an axial, partial sectional view of a duct joint constructed according to the invention.

DESCRIPTION OF THE PREFERRED EMBODIMENT

Now in accordance with the invention there has been found a duct joint containing a bellows seal providing for rotational and angular movement between rigid duct sections, while minimizing the escape of compressed air through the conduit system. Further, the bellows seal is essentially pressure-balanced, thus minimizing pressure-induced wear of the seal. Still further, the construction of the duct joint minimizes friction between the moving parts, further minimizing wear.

With reference to FIG. 1, there is illustrated a duct joint 10 connecting two cylindrical ducts 12 and 14. The ducts can be formed from various metals, such as titanium, stainless steel, or nickel-based alloys depending on the requirements of a particular application. Similarly, the duct joint can be constructed of any suitable metal or combination of metals.

The duct joint 10 has a circular cross section and defines an axis a. The duct joint is made of two halves for ease of assembly. One joint half 16, has a cylindrical collar 18 and a seal gland 20 extending longitudinally and canted inwardly from one end of the collar. As used in the context of the specification and claims, inwardly means towards the axis of the duct joint, while outwardly means away from the axis.

The collar 18 has a diameter substantially equal to the diameter of the duct 12 and is butt-welded to the duct to form a gas-tight seal. When the collar is secured, the cylindrical joint section 16 is aligned with the duct to ensure a smooth flow of air therethrough.

The seal gland 20 has an outer surface 22. The outer surface includes a region defining a static seal face 24 oriented in a plane transverse to the collar 18.

A second joint half 26 incorporates a second cylindrical collar 30. The second collar has a diameter substantially equal to the diameter of the duct 14 and is butt-welded to the duct to form a gas-tight seal. When the collar is secured in place, the collar is aligned with the duct to ensure a smooth flow of air therethrough. Extending longitudinally and canted outwardly from the collar is an inner race member 32.

The inner surface of the inner race 32 member defines a bearing surface 33 spaced apart from and generally opposing the outer surface 22 of the seal gland 20. The bearing surface has a region defining a dynamic seal face 34.

An annular bellows seal 36 is disposed between the static seal face 24 and the dynamic seal face 34. When the joint 10 is assembled, a predetermined installation end load is created causing the bellows seal to bear against the two seal faces and forming a low leakage seal between the two joint halves, 16 and 26.

Turning in greater detail to the design and construction of the bellows seal 36, it is made of any suitable metal and, preferably, is made of an alloy, such as alloy 718, to provide a compatible interface with the seal gland 20 and the inner race member 32. It is an advantage of the duct joints in accordance with the invention, that they can be made entirely of high-temperature stable metals and, thus, can be employed under the extreme temperature conditions created by today's jet aircraft.

The bellows seal 36 contains convolutions 42, 44 and 46, each formed by two sidewalls connected by a crest. In turn, adjacent convolutions are connected by a trough, where the nadir of each trough is equidistant from the axis a.

The outside diameter of a convolution is twice the length of a normal radial line drawn from the apex of its crest to the axis a. The inside diameter of a convolution is twice the length of a normal radial line drawn from the nadir of the adjacent trough to the axis. The mean diameter of a convolution is the algebraic average of the outside and inside diameters and decreases in the direction of the static seal face 24 to the dynamic seal face 34. The effective diameter of the bellows is the algebraic average of all the individual convolution mean diameters.

For example, the convolution 42 is formed by sidewalls 47 and 48 joined by a crest 49 and the convolution is connected to the convolution 44 by a trough 50. The convolution 42 has an outside diameter v, an inside diameter w, and a mean diameter x.

The static seal between the bellows 36 and the seal face 24 is formed between the seal face and a protuberance 52 on the sidewall 47 of the convolution 42. The protuberance helps maintain the integrity of the seal should deformation of the sidewall occur.

The dynamic seal is formed between the bellows 36 and the dynamic seal face 34 near the crest of the convolution 46. The dynamic sealing diameter is twice the length of a normal line u drawn from the point of contact of the bellows and the bearings surface 33 to the axis a. A low leakage seal is created between the dynamic seal face and the bellows seal, when the sealing diameter of the dynamic seal is substantially the same as the effective diameter of the bellows.

The center of angulation of the joint is determined by reference to a line T tangent to the bearing surface 33 at the point where the bellows seal 36 contacts the bearing surface. The center of angulation of the joint is determined by where a line y normal to the tangent line intersects the axis a. The angle formed between the normal line and the axis defines the nominal angle. A significant benefit of the duct joint in accordance with the invention is that the configuration of the bearing surface 33 can be chosen so that the joint angulates at a point other than at the center of the joint. Varying the curvature of the surface changes the nominal angle and causes the center of angulation to be moved along the axis, as shown by lines y, y', y", and y'". The ability to vary where the joint angulates adds great flexibility to the design of duct joints, in particular, and conduit systems in general by enabling conduit reaction loads to be transferred to more desirable locations.

It is a major advantage of duct joints in accordance with the invention that the seal can be substantially pressure balanced, i.e., the pressure-induced end load exerted by the bellows seal on the dynamic seal face can be essentially zero. Alternatively, the seal in accordance with the invention provides the flexibility, to provide embodiments that are not pressure balanced. For example, the bellows seal can produce a positive pressure, i.e., to induce an additional end load in order to ensure the integrity of the seal. Or the bellows seal can produce a negative pressure, i.e., to reduce the end load which may be desirable to relieve installation end loads.

The pressure-induced end load is a function of the sealing diameter of the dynamic seal and the overall effective diameter of the bellows. When the seal is designed so the bellows' effective diameter equals the sealing diameter of the dynamic seal, the bellows produces no pressure-induced end load and the seal is pressure balanced. When the bellows effective diameter is greater than sealing diameter of the dynamic seal face, the bellows are inclined to axially expand increasing the installation end load against the dynamic seal face. When the bellows effective diameter is less than the sealing diameter of the dynamic seal face, the bellows are inclined to contract reducing the installation end load against the dynamic seal face.

It is still a further benefit of the joints in accordance with the invention that the bellows seal resists the angulation motion produced by the action of the joints' moving parts. When the bellows exerts a relatively high, installation end load, there is essentially no bellows seal motion.

Returning to the inner race member 32, its outer surface defines an outer bearing surface 53. An outer race member 54 has an inner surface defining a complementary bearing surface 56. Both bearing surfaces share a center of angulation in common with the center of angulation defined by the dynamic seal. To reduce friction between the bearing surfaces, by minimizing the contact between the two, the first bearing surface defines apices of two curvilinear regions 58 having a lubricating grove 60 in between.

The duct joint 10 is made self-lubricating by placing a high temperature lubricant, such as graphite petrolatum, in the lubricating groove 60. The reservoir of lubricant minimizes frictional forces as the two contact surfaces pass over one another. Additional lubrication is achieved by coating the inner surface 56 of the outer race 54 with a dry film lubricant.

An annular clip 62, one end of which is secured in a recess 64 of the inner race member 32, biases the inner race member to the outer race member 54. The annular clip has an inner surface defining a third bearing surface 66 which secures a fourth bearing surface 68 defined by the outer surface to the outer race member. These bearing surfaces also share a center of angulation in common with the center of angulation defined by the dynamic seal. This arrangement allows the second bearing surface 56 to slidably contact the first bearing surface. Thus as the duct joint 10 is subject to rotation and angulation, the complimentary first and second bearing surfaces move over one another and provide flexibility to the duct joint. The annular clip provides the further advantage of acting as a dust cover to protect the joint from contaminants.

Flange profiles 70 extend outwardly. As is well known by those skilled in the art, the flange profiles and, hence, the two haves can be secured to one another using a conventional flange coupling 72.

It will, of course, be understood that modifications to the presently preferred embodiments will be apparent to those skilled in the art. Consequently, the scope of the present invention should not be limited by the particular embodiments discussed above, but should be defined only by the appended claims which are intended to cover all reasonable equivalents and are to be interpreted as broadly as the prior art will permit.

I claim:

1. A joint for sealing first and second cylindrical ducts comprising:
   a first half having
     a cylindrical first collar for forming a gas-tight seal with the first duct, and
     an annular seal gland extending longitudinally and canted from the first collar having an outer surface, the outer surface of the seal gland having a region defining a static seal face; and
   a second half having
     a cylindrical second collar for forming a gas-tight seal with the second duct,
     an inner race member extending longitudinally and canted from the second collar having inner and outer surfaces, the inner surface spaced apart from and generally opposing the outer surface of the seal gland and having a region defining a dynamic seal face and the outer surface defining a first bearing surface,
     an annular bellows constructed of a plurality of convolutions disposed between the static and dynamic seal faces forming thereon a static seal and a dynamic seal, respectively, where the convolutions have mean diameters which decrease in the direction of the static to the dynamic seals,
     an outer race member having an inner surface defining a second bearing surface with a center of angulation substantially the same as the center of angulation of the first bearing surface slidably contacting the first bearing surface,
     means for biasing the first bearing surface against the second bearing surface, and
     means for coupling the first half to the second half.

2. The joint in accordance with claim 1 wherein the bellows contains three convolutions.

3. The joint in accordance with claim 1 wherein the bellows produces substantially no pressure-induced end load.

4. The joint in accordance with claim 1 wherein the bellows produces a positive, pressure-induced end load.

5. The joint in accordance with claim 1 wherein the bellows produces a negative, pressure-induced end load.

6. The joint in accordance with claim 1 wherein one of said inner race member's outer bearing surface and said outer race member's inner bearing surface defines apices of two curvilinear regions having an annular groove therebetween.

7. The joint in accordance with claim 6 further comprising the annular groove contains a high temperature lubricant.

8. The joint in accordance with claim 1 wherein the inner race member's outer bearing surface defines apices of two curvilinear regions having an annular groove therebetween.

9. The joint in accordance with claim 1 wherein the effective diameter of the bellows equals the sealing diameter of the dynamic seal.

10. The joint in accordance with claim 1 wherein the effective diameter of the bellows is less than the sealing diameter of the dynamic seal.

11. The joint in accordance with claim 1 wherein the effective diameter of the bellows is greater than the sealing diameter of the dynamic seal.

12. A joint for sealing first and second cylindrical ducts comprising:
   a first half having
     a cylindrical first collar for forming a gas-tight seal with the first duct, and
     an annular seal gland extending longitudinally and canted from the first collar having an outer surface, the outer surface of the seal gland having a region defining a static seal face; and
   a second half having
     a cylindrical second collar for forming a gas-tight seal with the second duct,
     an inner race member extending longitudinally and canted from the second collar having inner and outer surfaces, the inner surface spaced apart from and generally opposing the outer surface of the seal gland and having a region defining a dynamic seal face and the outer surface defining a first bearing surface,
     an annular bellows constructed of at least three convolutions disposed between the static and dynamic seal faces forming thereon a static seal and a dynamic seal, respectively, where the convolutions have mean diameters which decrease in the direction of the static to the dynamic seals, and where the effective diameter of the bellows is substantially equal to the sealing diameter of the dynamic seal,
     an outer race member having an inner surface defining a second bearing surface with a center of angulation substantially the same as the center of angulation of the first bearing surface slidably contacting the first bearing surface,
     means for biasing the first bearing surface against the second bearing surface, and
     means for coupling the first half to the second half.

13. A joint for sealing first and second cylindrical ducts comprising:

a first half having
- a cylindrical first collar for forming a gas-tight seal with the first duct, and
- an annular seal gland having a region defining a static seal face; and a second half having
- a cylindrical second collar for forming a gas-tight seal with the second duct,
- an inner race member having inner and outer surfaces, the inner surface having a region defining a dynamic seal face, and the outer surface forming a first bearing surface;
- means for forming a seal between the static seal face and the dynamic seal face;
- an outer race member having an inner surface forming a second spherical bearing surface having a center of angulation substantially the same as the center of angulation of the first bearing surface for slidably contacting the first bearing surface and one of the bearing surfaces defined by apices of two curvilinear regions having an annular grove therebetween;
- means for biasing the first bearing surface against the second bearing surface; and
- means for coupling the first half to the second half.

14. The joint in accordance with claim 13 further comprising the annular groove contains a high temperature lubricant.

15. The joint in accordance with claim 13 wherein the first bearing surface is defined by the apices of two curvilinear regions having an annular groove therebetween.

* * * * *

UNITED STATES PATENT AND TRADEMARK OFFICE
CERTIFICATE OF CORRECTION

PATENT NO. : 5,697,651
DATED : Dec. 16, 1997
INVENTOR(S) : Leslie Fernandes

It is certified that error appears in the above-indentified patent and that said Letters Patent is hereby corrected as shown below:

| | |
|---|---|
| Col. 2, Ln. 30 | Between "end" and "load" insert hyphen |
| Col. 4, Ln. 67 | Delete "grove" and insert instead --groove-- |
| Col. 5, Ln. 26 | Delete "haves" and insert instead --halves-- |
| Col. 8, Ln. 5 | Delete "grove" and insert instead --groove-- |

Signed and Sealed this

Eighth Day of December, 1998

Attest:

Attesting Officer

BRUCE LEHMAN

Commissioner of Patents and Trademarks